United States Patent
Kamio

(10) Patent No.: US 11,112,008 B2
(45) Date of Patent: Sep. 7, 2021

(54) VEHICLE CONTROL DEVICE

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/871,372

(22) Filed: May 11, 2020

(65) Prior Publication Data
US 2020/0271224 A1    Aug. 27, 2020

Related U.S. Application Data

(63) Continuation of application No. PCT/JP2018/042402, filed on Nov. 16, 2018.

(30) Foreign Application Priority Data

Nov. 24, 2017  (JP) .............................. JP2017-226017

(51) Int. Cl.
    *F16H 61/12*  (2010.01)
    *F16H 63/48*  (2006.01)

(52) U.S. Cl.
    CPC .......... *F16H 63/483* (2013.01); *F16H 61/12* (2013.01); *F16H 2061/1224* (2013.01); *F16H 2061/1288* (2013.01)

(58) Field of Classification Search
    CPC ............... F16H 2059/746; F16H 61/12; F16H 2061/0056; F16H 2061/1208; F16H 2061/1224; F16H 2061/1232; F16H 2061/1288; F16H 2312/20; F16H 63/48; F16H 63/483; B60W 10/10; B60W 10/11; B60W 10/182
    See application file for complete search history.

(56) References Cited

U.S. PATENT DOCUMENTS

| | | | |
|---|---|---|---|
| 2005/0146302 A1 | 7/2005 | Kamio et al. | |
| 2005/0156550 A1 | 7/2005 | Kamio et al. | |
| 2009/0120222 A1* | 5/2009 | Kimura | F16H 63/3416 74/335 |

(Continued)

FOREIGN PATENT DOCUMENTS

| | | |
|---|---|---|
| JP | 2011-74981 | 4/2011 |
| WO | 2019/088245 | 5/2019 |

(Continued)

OTHER PUBLICATIONS

U.S. Appl. No. 16/871,335, to Kamio, entitled: "Vehicle Control Device", filed May 11, 2020 (22 pages).

*Primary Examiner* — Edwin A Young

(74) *Attorney, Agent, or Firm* — Nixon & Vanderhye P.C.

(57) ABSTRACT

A vehicle control device controls a vehicle control system, which includes a shift range switching system configured to switch a shift range by controlling a drive of a shift actuator, and an electric brake system configured to brake a vehicle by controlling a drive of a brake actuator. The vehicle control device includes a shift control unit and a brake control unit. The shift control unit controls a drive of the shift actuator. The brake control units control a drive of a brake actuator. When the start switch of the vehicle is turned off, the power of the brake control units is turned off after the shift range switching system completes switching to the P range.

2 Claims, 7 Drawing Sheets

(56) References Cited

U.S. PATENT DOCUMENTS

| | | | |
|---|---|---|---|
| 2010/0312424 A1* | 12/2010 | Yasui | F16H 61/12 |
| | | | 701/22 |
| 2010/0326148 A1* | 12/2010 | Gierling | F16H 63/483 |
| | | | 70/248 |
| 2011/0193721 A1* | 8/2011 | Koie | B60R 25/00 |
| | | | 340/901 |
| 2012/0010785 A1* | 1/2012 | Kanai | B60L 15/2081 |
| | | | 701/48 |
| 2013/0252784 A1 | 9/2013 | Kinoshita et al. | |
| 2017/0335960 A1 | 11/2017 | Nagata et al. | |

FOREIGN PATENT DOCUMENTS

| | | |
|---|---|---|
| WO | 2019/098308 | 5/2019 |
| WO | 2019/102933 | 5/2019 |

\* cited by examiner

FIG. 4

| TARGET RANGE | ACTUAL RANGE | INFLUENCE ON VEHICLE | FAIL SAFE PROCESS | |
|---|---|---|---|---|
| | | | PRESENT | ABSENT |
| P | P | NORMAL | — | — |
| | R | P ABNORMALITY, RUN BACKWARD | FORCED NEUTRAL | FORCED NEUTRAL, COMMAND BRAKE, OUTSIDE NOTIFICATION |
| | N | P ABNORMALITY, SLIDE DOWN | — | COMMAND BRAKE, OUTSIDE NOTIFICATION |
| | D | P ABNORMALITY, RUN AWAY | FORCED NEUTRAL | FORCED NEUTRAL, COMMAND BRAKE, OUTSIDE NOTIFICATION |
| R/D | R/D | NORMAL | — | — |
| | D/R | RUN BACKWARD | FORCED NEUTRAL | FORCED NEUTRAL, COMMAND BRAKE, OUTSIDE NOTIFICATION |
| | N | NOT ACCELERATE | — | COMMAND BRAKE, OUTSIDE NOTIFICATION |
| | P | ABNORMAL NOISE (HIGH-SPEED RUNNING), SUDDEN DECELERATION (EXTREMELY LOW SPEED RUNNING) | FORCED NEUTRAL | FORCED NEUTRAL, COMMAND BRAKE, OUTSIDE NOTIFICATION |

VEHICLE CONTROL DEVICE

CROSS REFERENCE TO RELATED APPLICATION

This application is a continuation application of International Patent Application No. PCT/JP2018/042402 filed on Nov. 16, 2018, which designated the U.S. and based on and claims the benefits of priority of Japanese Patent Application No. 2017-226017 filed on Nov. 24, 2017. The entire disclosure of all of the above applications is incorporated herein by reference.

TECHNICAL FIELD

The present disclosure relates to a vehicle control device.

BACKGROUND

There has hitherto known a shift range switching device that switches a shift range by controlling a motor in response to a shift range switching request from a driver.

SUMMARY

An object of the present disclosure is to provide a vehicle control device that improves safety when an abnormality occurs in a shift range switching system.

The vehicle control device according to the present disclosure controls a vehicle control system including a shift range switching system and an electric brake system. The shift range switching system switches a shift range by controlling a drive of a shift actuator. The electric brake system brakes a vehicle by controlling a drive of a brake actuator.

The vehicle control device includes a shift control unit that controls a drive of the shift actuator, and a brake control unit that controls a drive of the brake actuator. When a start switch of the vehicle is turned off, the power of the brake control unit is turned off after the shift range switching system completes the switching to the P range.

BRIEF DESCRIPTION OF DRAWINGS

The above and other objects, features and advantages of the present disclosure will become more apparent from the following detailed description made with reference to the accompanying drawings. In the drawings:

FIG. 4 is an explanatory diagram illustrating a fail safe process according to one embodiment;

DETAILED DESCRIPTION

One Embodiment

Figure 1:
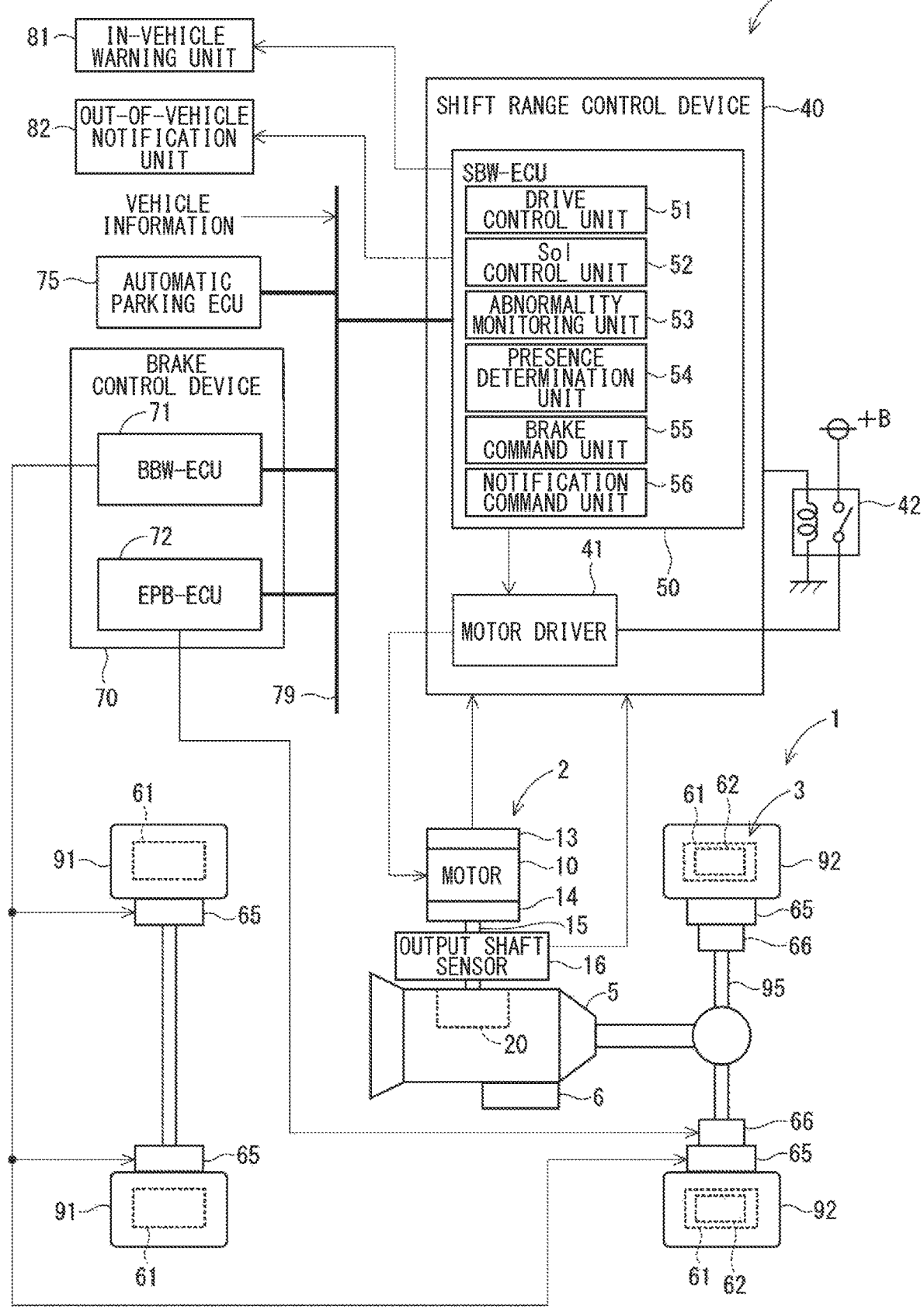
FIG. 1 is a schematic configuration diagram illustrating a vehicle control system according to one embodiment.

Hereinafter, a vehicle control device according to the present disclosure will be described with reference to the drawings. As shown in FIG. 1, a vehicle control device 100 controls a vehicle control system 1. The vehicle control system 1 includes a shift-by-wire system 2 as a shift range switching system, and an electric brake system 3. The electric brake system 3 includes a brake-by-wire device 61 and an electric parking brake device 62. Hereinafter, shift-by-wire is referred to as "SBW", brake-by-wire is referred to as "BBW", and electric parking brake is referred to as "EPB".

Figure 2:
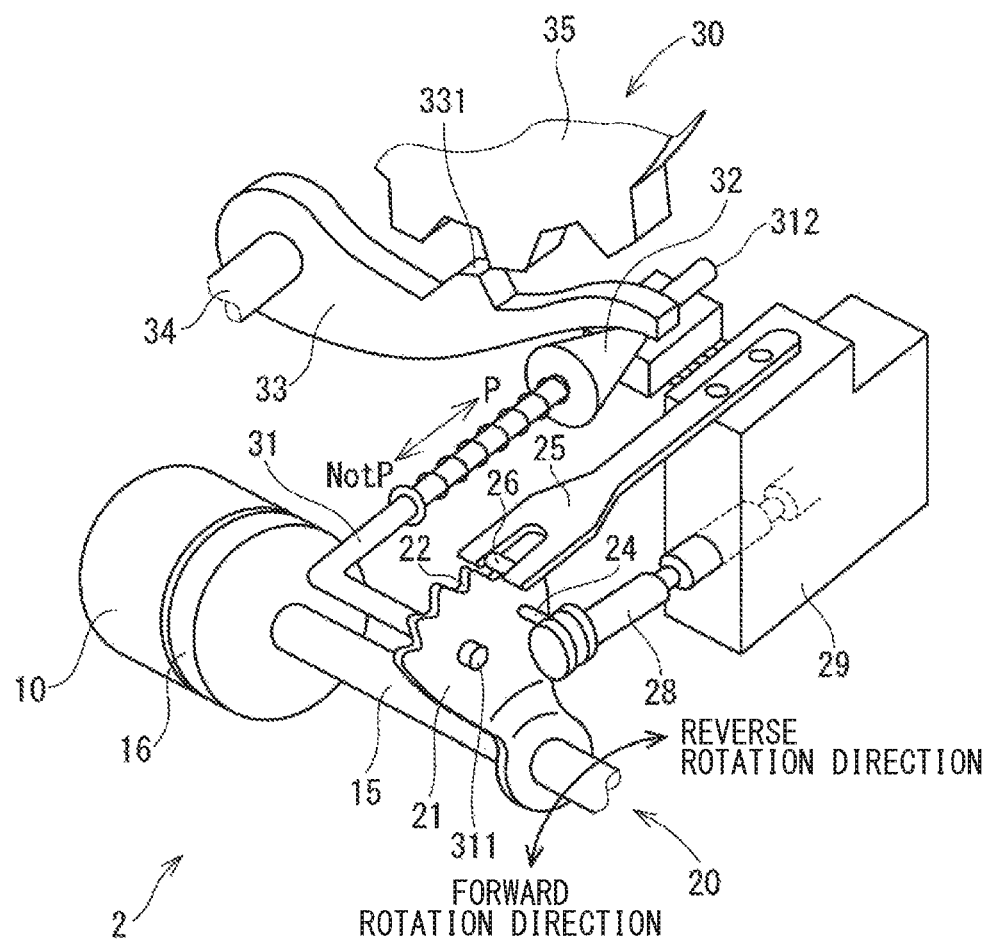
FIG. 2 is a perspective view of a shift-by-wire system according to one embodiment.

As shown in FIGS. 1 and 2, the shift-by-wire system 2 includes a motor 10 as a shift actuator, a shift range switching mechanism 20, a parking lock mechanism 30, and the like. The motor 10 rotates by being supplied with electric power from a battery (not shown) mounted in a vehicle, and functions as a drive source for the shift range switching mechanism 20.

An encoder 13 detects a rotary position of a rotor (not shown) of the motor 10. The encoder 13 is, for example, a magnetic rotary encoder and is made up of a magnet that rotates integrally with the rotor, a magnetic detection hall integrated circuit (IC), and the like. The encoder 13 outputs A-phase and B-phase pulse signals at predetermined angles in synchronization with the rotation of the rotor.

A decelerator 14 is provided between a motor shaft of the motor 10 and an output shaft 15 to decelerate the rotation of the motor 10 and output the rotation to the output shaft 15. The rotation of the motor 10 is thus transmitted to the shift range switching mechanism 20. An output shaft sensor 16 for detecting an angle of the output shaft 15 is provided on the output shaft 15. The output shaft sensor 16 is, for example, a potentiometer.

As shown in FIG. 2, the shift range switching mechanism 20 includes a detent plate 21, a detent spring 25 and the like. The shift range switching mechanism 20 transmits the rotational drive force output from the decelerator 14 to a manual valve 28 and a parking lock mechanism 30. The detent plate 21 is fixed to the output shaft 15 and driven by the motor 10.

The detent plate 21 has a pin 24 protruding in parallel with the output shaft 15. The pin 24 is connected to the manual valve 28. The detent plate 21 is driven by the motor 10, whereby the manual valve 28 reciprocates in an axial direction. That is, the shift range switching mechanism 20 converts the rotational motion of the motor 10 into a linear motion and transmits the linear motion to the manual valve 28. The manual valve 28 is provided on a valve body 29. When the manual valve 28 moves back and forth in the axial direction to switch hydraulic pressure supply paths, which are lead to a hydraulic clutch (not shown), thereby to switch an engagement state of the hydraulic clutch. In this way, the shift range is switched.

Four recesses 22 each holding the manual valve 28 in a position corresponding to an associated range are formed in the detent plate 21 on the detent spring 25 side. The recesses 22 each correspond to each of the shift ranges of D (drive), N (neutral), R (reverse), and P (park) ranges from the proximal end of the detent spring 25.

The detent spring 25 is an elastically deformable plate-like member, and is provided with a detent roller 26 at a tip of the detent spring 25. The detent roller 26 fits into one of the recess portions 22. The detent spring 25 biases the detent roller 26 toward a rotation center of the detent plate 21. When a rotational force equal to or greater than a predetermined force is applied to the detent plate 21, the detent spring 25 is elastically deformed, and the detent roller 26 moves in the recesses 22. When the detent roller 26 is fitted to any of the recesses 22, swing of the detent plate 21 is regulated. Accordingly, the axial position of the manual valve 28 and the state of the parking lock mechanism 30 are determined to fix a shift range of an automatic transmission 5.

The parking lock mechanism 30 includes a parking rod 31, a conical member 32, a parking lock pawl 33, a shaft part 34 and a parking gear 35. The parking rod 31 is formed in a substantially L-shape. The parking rod 31 is fixed to the detent plate 21 on the side of one end 311. The conical member 32 is provided to the other end 312 of the parking rod 31. The conical member 32 is formed to reduce in diameter toward the other end 312. When the detent plate 21 pivots in a reverse rotation direction, the conical member 32 moves toward a direction of an arrow P.

The parking lock pawl 33 is configured to abut on a conical surface of the conical member 32 and to pivot around the shaft part 34, and the parking lock pawl 33 has a protrusion 331 on the side of the parking gear 35. The protrusion 331 is configured to mesh with the parking gear 35. When the detent plate 21 rotates in the reverse rotation direction and the conical member 32 moves in the direction of arrow P, the parking lock pawl 33 is pushed up, and the protrusion 331 meshes with the parking gear 35. To the contrary, when the detent plate 21 rotates in the forward direction to move the conical member 32 in the direction shown by the arrow Not P, the protrusion 331 is disengaged from the parking gear 35.

The parking gear 35 is provided on an axle 95 (see FIG. 1) and is enabled to mesh with the protrusion 331 of the parking lock pawl 33. The parking gear 35 and the protrusion 331 mesh with each other, whereby the rotation of the axle 95 is restricted. When the shift range is one of NotP ranges, which are other than the P range, the parking gear 35 is not locked by the parking lock pawl 33 and the rotation of the axle 95 is not restricted by the parking lock mechanism 30. When the shift range is the P range, the parking gear 35 is locked by the parking lock pawl 33 and the rotation of the axle 95 is restricted. When the vehicle speed exceeds a predetermined speed (for example, 4 km/h), the conical member 32 is repelled, and the axle 95 is configured not to be locked.

As shown in FIG. 1, the electric brake system 3 includes a BBW device 61, an EPB device 62, a BBW actuator 65, an EPB actuator 66, and the like. The BBW device 61 is installed in the front wheel 91 and the rear wheel 92. The BBW device 61 is, for example, a disk brake, and generates a braking force by sandwiching a brake rotor that rotates together with the front wheel 91 or the rear wheel 92 from both sides with a brake pad using a brake caliper. The EPB device 62 is installed in the rear wheel 92. The EPB device 62 is, for example, a drum brake and is built in the BBW device 61.

The BBW actuator 65 causes the BBW device 61 to perform braking based on a command from a BBW-ECU 71 described later. For example, the BBW actuator 65 has a motor, and operates the brake caliper by driving the motor. Further, for example, the BBW actuator 65 has a pump motor, an electric hydraulic pump, a hydraulic booster, and a solenoid valve. The BBW actuator 65 increases the hydraulic pressure generated by driving the electric hydraulic pump by the pump motor with the hydraulic booster, and supplies the BBW device 61 with a hydraulic pressure obtained by adjusting the increased hydraulic pressure with the solenoid valve. Although the BBW actuator 65 is installed in each of the front wheel 91 and the rear wheel 92 in FIG. 1, for example, a hydraulic circuit or the like may be shared.

The EPB actuator 66 causes the EPB device 62 to perform braking based on a command from an EPB-ECU 72 described later. When the EPB device 62 is operated by the EPB actuator 66, the braking state is maintained by the ratchet mechanism even after the power supply to the EPB actuator 66 is turned off. Further, by performing a release operation in accordance with a command from the EPB-ECU 72, the braking state is released. In the present embodiment, the BBW actuator 65 and the EPB actuator 66 correspond to "brake actuator".

The vehicle control device 100 includes a shift range control device 40 and a brake control device 70. The shift range control device 40 includes a motor driver 41, an SBW-ECU 50, and the like. The motor driver 41 has switching elements (not shown), and turns on/off the switching elements based on a command from the SBW-ECU 50 to switch the energization of the motor 10. Thereby, the drive of the motor 10 is controlled. A motor relay 42 is provided between the motor driver 41 and a battery. By controlling the on/off operation of the motor relay 42, the allowance or the cutoff of the power supply from the battery to the motor 10 is switched.

The SBW-ECU 50 includes a drive control unit 51, a solenoid control unit 52, an abnormality monitoring unit 53, a presence determination unit 54, a brake command unit 55, a notification command unit 56, and the like. The drive control unit 51 controls the switching of the shift range by controlling the drive of the motor 10 based on the driver's request shift range, a signal from a brake switch, a vehicle speed, and the like. Specifically, the drive control unit 51 controls the drive of the motor 10 by performing a feedback control or the like such that the motor 10 is stopped at a position where the motor angle θm, which is the rotation angle of the motor 10, matches the target angle θcmd set in response to the required shift range. The detail of the drive control for the motor 10 may be anything.

The solenoid control unit 52 controls a drive of a transmission hydraulic control solenoid 6 based on a vehicle speed, an accelerator position, a shift range requested by a driver, and the like. The transmission hydraulic control solenoid 6 is controlled to manipulate a shift stage. The number of the transmission hydraulic control solenoid 6 is determined according to the shift stage or the like. In the present embodiment, the solenoid control unit 52 is provided in the SBW-ECU 50, and the SBW-ECU 50 controls the motor 10 and the solenoid 6. However, the motor control ECU for controlling the motor 10 and the AT-ECU for controlling the solenoid may be separated, and the AT-ECU may be configured to have the solenoid control unit 52.

The abnormality monitoring unit 53 monitors an abnormality of the shift-by-wire system 2. The presence determination unit 54 determines whether the driver is on the driver's seat based on information such as a weight sensor provided in the driver's seat, a seat belt sensor, a door open/close detection sensor, and the like. The details of determining the presence may be anything.

The brake command unit 55 commands the brake control device 70 to perform vehicle braking by the electric brake system 3. The notification command unit 56 commands to notify information that an abnormality has occurred in the shift-by-wire system 2. In the present embodiment, the notification command unit 56 commands the in-vehicle warning unit 81 and the out-of-vehicle notification unit 82 to issue a warning. Further, the notification command unit 56 notifies other ECUs such as a superordinate ECU (not shown) that the shift-by-wire system 2 is abnormal via the vehicle communication network 79, and the other ECU commands the in-vehicle warning unit 81 and the out-of-vehicle notification unit 82 to notify the information.

The brake control device 70 has a BBW-ECU 71, an EPB-ECU 72, and the like. The BBW-ECU 71 controls the braking force and the like of the BBW device 61 by controlling the BBW actuator 65 in response to an operation amount of a brake pedal (not shown). The EPB-ECU 72 controls braking and release of braking by the EPB device 62 by controlling the EPB actuator 66.

The automatic parking ECU 75 controls the shift-by-wire system 2, the electric brake system 3, an unillustrated vehicle drive system including an engine and a main motor, an unillustrated electric steering system, and the like, and controls the drive of the vehicle so as to perform automatic parking.

Each of ECUs 50, 71, 72, and 75 is mainly composed of a microcomputer and the like, and internally includes, although not shown in the figure, a CPU, a ROM, a RAM, an I/O, a bus line for connecting these components, and the like. Each process executed by the ECU 50, 71, 72, and 75 may be software processing or may be hardware processing. The software processing may be implemented by causing a CPU to execute a program. The program may be stored beforehand in a material memory device such as a ROM, that is, in a readable non-transitory tangible storage medium. The hardware processing may be implemented by a special purpose electronic circuit. Further, each of the processes in the ECUs 50, 71, 72, and 75 may be executed by an ECU different from the ECU described as an implementation entity in this specification. Further, some ECUs may be collectively configured as one ECU.

The ECUs 50, 71, 72, and 75 are activated when a start switch such as an ignition switch is turned on. Hereinafter, the start switch of the vehicle will be referred to as "IG" as appropriate. The ECUs 50, 71, 72, and 75 exchange information with each other via a vehicle communication network 79, such as a CAN (Controller Area Network), and acquires various types of vehicle information including a driver requested shift range, a brake switch, an accelerator opening angle, a vehicle speed, a state of a driver presence detection switch, and the like. The ECUs 50, 71, 72, and 75 may directly acquire the above mentioned information without passing through the vehicle communication network 79. In FIG. 1, some control lines and the like, such as a control line to one side of the rear wheel 92, are omitted for avoiding complication.

The in-vehicle warning unit 81 notifies the driver in the vehicle that the abnormality is occurred in the shift-by-wire system 2. The notification method to the driver may be any method such as a warning display on an instrument panel or the like, a lighting of a warning lamp or a voice notification.

The out-of-vehicle notification unit 82 notifies the outside of the vehicle that the abnormality is occurred in the shift-by-wire system 2. The notification method to the outside of the vehicle is, for example, an alarm by a buzzer sound to the outside of the vehicle. Further, for example, a notification may be made to a vehicle key or a communication terminal such as a driver's smartphone.

The vehicle control system 1 of the present embodiment has an automatic parking function. Thereby, the vehicle automatically parks by automatically controlling the shift-by-wire system 2, the electric brake system 3, the vehicle drive system, the electric steering system, and the like. In a vehicle without an automatic parking function, it is assumed that the driver is on the driver's seat. In the shift-by-wire system 2, for example, even if a P range abnormality that the range does not shift to the P range occurs, the driver is warned that the parking brake is to be operated, and the driver can operate the parking brake in order to ensure safety.

On the other hand, in a vehicle with the automatic parking function, a remote parking is possible in which the driver gets off the vehicle and instructs a parking of the vehicle from outside the vehicle. If an abnormality occurs in the shift-by-wire system 2 in a state where the driver is absent in the vehicle, the driver cannot be notified of the abnormality even if the warning is displayed on, for example, the instrument panel. Therefore, there is a possibility that safety may not be ensured.

Figure 3:
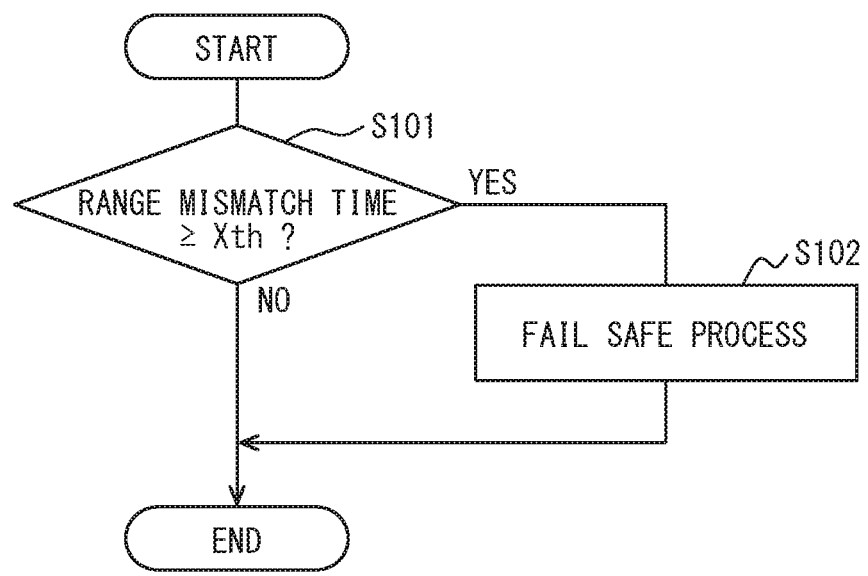
FIG. 3 is a flowchart illustrating an abnormality monitoring process according to one embodiment.

In the present embodiment, when an abnormality occurs in the shift-by-wire system 2, different fail safe processes are performed depending on whether the driver is present in the vehicle or not. The abnormality monitoring process according to the present embodiment will be described with reference to the flowchart in FIG. 3. The present process is executed by the SBW-ECU 50 at a predetermined cycle interval. Hereinafter, "step" in step S101 is omitted, and is simply referred to as a symbol "S."

In S101, the abnormality monitoring unit 53 determines whether the range mismatch time during which the actual range does not match the target shift range is equal to or longer than the determination time Xth. Here, the actual range is an actual shift range, and corresponds to the recess 22 into which the detent roller 26 is fitted. In other words, the actual range depends on the rotational position of the output shaft 15. The determination time Xth is set to a time (for example, 0.5 [ms]) sufficiently longer than the time required for switching range. When it is determined that the range mismatch time is shorter than the determination time Xth (S101: NO), it is determined that the shift-by-wire system 2 is normal, and the process of S102 is not performed. When it is determined that the range mismatch time is equal to or longer than the determination time Xth (S101: YES), it is determined that the abnormality due to the range mismatch has occurred, and the process proceeds to S102. Thereby, different fail safe processes are performed depending on whether the driver is present in the vehicle or not.

Details of the fail safe process will be described with reference to FIG. 4. Although not shown in FIG. 4, when it is determined that the abnormality due to the range mismatch is detected, the motor relay 42 is turned off and the drive of the motor 10 is stopped as a fail safe process regardless of the driver's presence status and a range situation. Further, the in-vehicle warning unit 81 notifies the inside of the vehicle of the abnormality of the shift-by-wire system 2.

When the target range is the P range and the actual range is the P range, the target range and the actual range match. Therefore, the shift-by-wire system 2 is normal, and the fail safe process is not performed. Similarly, when the target range is the R range and the actual range is the R range, and when the target range is the D range and the actual range is the D range, the target range and the actual range match.

Therefore, the shift-by-wire system 2 is normal and the fail safe process is not performed.

When the target range is the P range and the actual range is the R range, a P abnormality occurs, in which the parking lock mechanism 30 cannot be locked, and there is a possibility that the vehicle may run backward as an influence on the vehicle. Also, when the target range is the P range and the actual range is the D range, the P abnormality occurs, and there is a possibility that the vehicle may run away as an influence on the vehicle. When the target range is the P range and the actual range is the R range or the D range in a state where the driver is present in the vehicle, the solenoid control unit 52 controls the solenoid 6 to forcibly put the automatic transmission 5 in the neutral state. In addition, by performing the in-vehicle warning, the driver is prompted to operate the parking brake.

When the target range is the P range and the actual range is the N range, the P abnormality occurs, and there is a possibility that the vehicle may slide down on a slope as an influence on the vehicle. Since the actual range is the N range, it is not necessary to put the automatic transmission in the neutral state.

When the target range is the P range and the actual range is the R range or the D range in a state where the driver is not present in the vehicle, the SBW-ECU 50 performs the same forced neutral process of the automatic transmission 5 as when the driver is present in the vehicle. Further, it commands the BBW-ECU 71 to perform a brake operation by the BBW device 61. Further, the notification command unit 56 commands the out-of-vehicle notification unit 82 to notify the outside of the vehicle of the abnormality of the shift-by-wire system 2.

When the target range is the P range and the actual range is the N range in a state where the driver is not present in the vehicle, the SBW-ECU 50 commands the BBW-ECU 71 to perform a brake operation by the BBW device 61. Further, the notification command unit 56 commands the out-of-vehicle notification unit 82 to notify the outside of the vehicle of the abnormality of the shift-by-wire system 2.

When the target range is the R range and the actual range is the D range, and when the target range is the D range and the actual range is the R range, there is a possibility that the vehicle runs backward in the direction opposite to the direction intended by the driver as an influence on the vehicle. When the target range is the R range and the actual range is the D range, and when the target range is the D range and the actual range is the R range in a state where the driver is present in the vehicle, the forced neutral process is performed.

When the target range is the R range or the D range and the actual range is the N range, there is a possibility that the vehicle may not accelerate as an influence on the vehicle. Since the actual range is the N range, it is not necessary to put the automatic transmission in the neutral state.

When the target range is the R range or the D range and the actual range is the P range, there is a possibility that an abnormal ratcheting noise is generated when the conical member 32 of the parking lock mechanism 30 is flipped during high-speed running as an influence on the vehicle. Further, when the vehicle is running at an extremely low speed lower than a predetermined speed at which the parking lock mechanism 30 can be locked, there is a possibility that a sudden deceleration of the vehicle occurs due to a lock of the parking lock mechanism 30. When the target range is the R range or the D range, the actual range is the P range in a state where the driver is present in the vehicle, the forced neutral process is performed.

When the target range is the R range and the actual range is the D range or the P range, and when the target range is the D range and the actual range is the R range or the P range in a state where the driver is not present in the vehicle, the SBW-ECU 50 performs the same forced neutral process of the automatic transmission 5 as when the driver is present in the vehicle. Further, the SBW-ECU 50 commands the BBW-ECU 71 to perform a brake operation by the BBW device 61. When the target range is the R range or the D range and the actual range is the N range in a state where the driver is not present in the vehicle, the SBW-ECU 50 commands the BBW-ECU 71 to perform a brake operation by the BBW device 61. Furthermore, when the abnormality of the range mismatch occurs in a state where the driver is not present in the vehicle, the notification command unit 56 instructs the out-of-vehicle notification unit 82 to notify the outside of the vehicle of the abnormality of the shift-by-wire system 2. When the target range is the R range or the D range in a state where the driver is not present in the vehicle, at least one of the BBW operation and the notification to the outside of the vehicle may be omitted.

In a state where the driver is not present in the vehicle, such as during the automatic parking, when the P abnormality in which the shift range cannot be shifted to the P range occurs, there is a possibility that the vehicle cannot be stopped by the parking lock mechanism 30 of the shift-by-wire system 2 and the vehicle may slip down. Therefore, in the present embodiment, when the P abnormality occurs in a state where the driver is not present in the vehicle, the BBW device 61 is operated by a command from the brake command unit 55 of the SBW-ECU 50 to stop the vehicle. That is, in the present embodiment, the fail safe process is performed by coordinating the shift-by-wire system 2 and the electric brake system 3. Thus, even if an abnormality occurs in the shift-by-wire system 2 when the driver is absent in the vehicle, unintended behaviors such as the vehicle slipping down after parking is completed can be prevented.

When the start switch of the vehicle such as the ignition switch is turned off after the automatic parking is completed, the ECUs 50, 71, 72, and 75 are turned off after executing the shutdown process and the like. Here, when the BBW-ECU 71 and the EPB-ECU 72 are turned off before the P shift is completed in the shift-by-wire system 2, if the P abnormality occurs after the ECUs 71 and 72 are turned off, it is not possible to stop the vehicle by the electric brake system 3. Therefore, in the present embodiment, after the SBW-ECU 50 is turned off, the BBW-ECU 71 and the EPB-ECU 72 are turned off.

Figure 5:
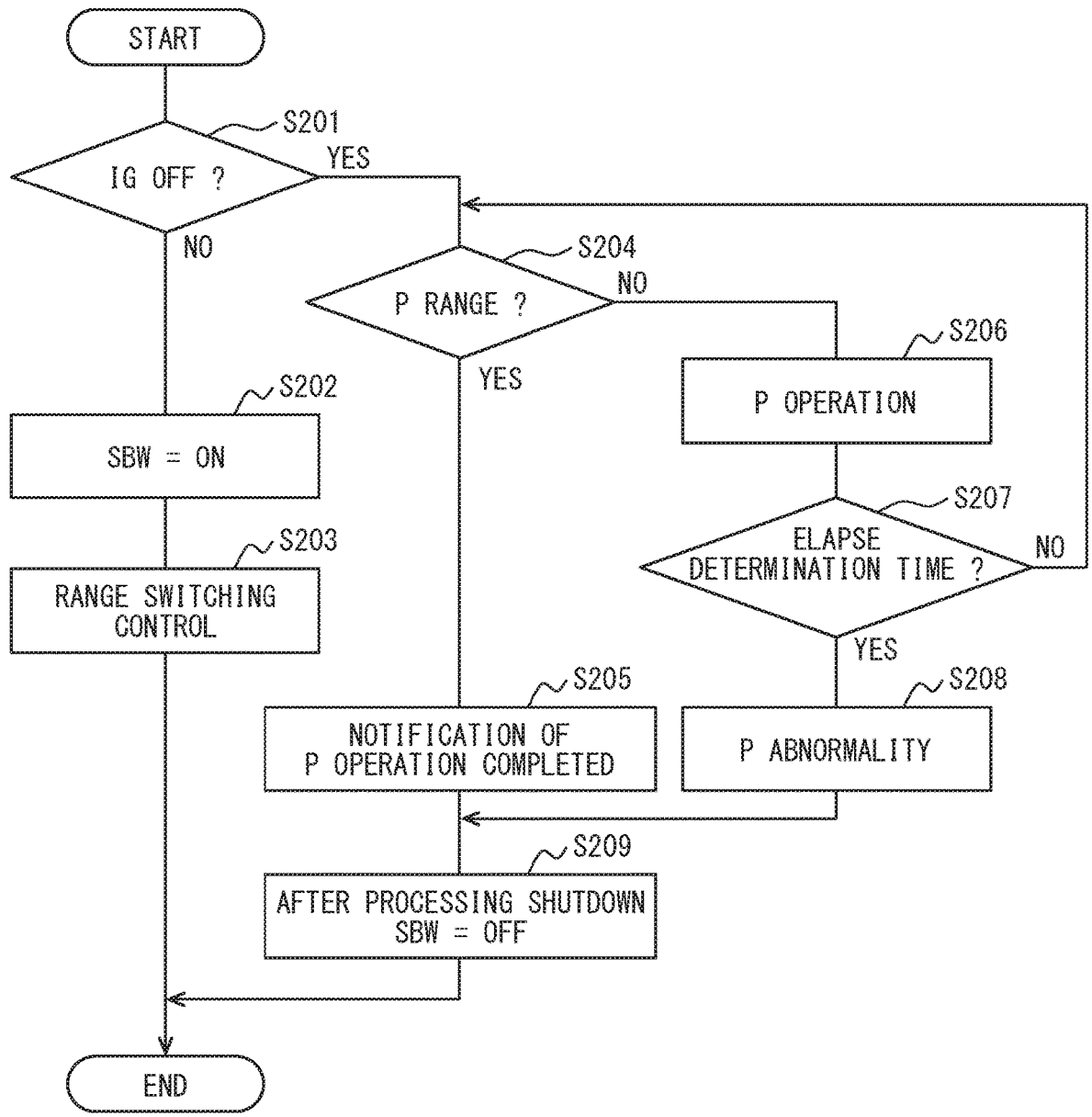
FIG. 5 is a flowchart illustrating a process for a power supply control in an SBW-ECU according to one embodiment.

A power supply control process in the SBW-ECU 50 will be described based on the flowchart of FIG. 5. The present process is executed by the SBW-ECU 50 at a predetermined cycle interval. In S201, the SBW-ECU 50 determines whether the IG is turned off. When it is determined that the IG is not turned off (S201: NO), the process proceeds to S202, and an ON state of the shift-by-wire system 2 is continued. In S203, the SBW-ECU 50 performs a range switching control in response to a command from the automatic parking ECU 75 or a shifter. When it is determined that the IG is turned off (S201: YES), the process proceeds to S204.

In S204, SBW-ECU 50 determines whether the actual range is the P range. When it is determined that the actual range is the P range (S204: YES), the process proceeds to S205, and the SBW-ECU 50 notifies the brake control device 70 of information that the P operation is completed. The notification to the brake control device 70 is given to at least one of the BBW-ECU 71 and the EPB-ECU 72. When it is determined that the P operation has not been completed (S204: NO), the process proceeds to S206, and the drive control unit 51 controls the motor 10 so that the actual range becomes the P range.

In S207, the abnormality monitoring unit 53 determines whether the determination time Xth has elapsed after the P operation command. When it is determined that the determination time Xth has not elapsed (S207: NO), the process returns to S204. When it is determined that the determination time Xth has elapsed (S207: YES), the process proceeds to S208, it is determined that the P abnormality has occurred, and the fail safe process for the P abnormality described with reference to FIG. 4 is executed.

In step S209 following step S205 or step S208, the SBW-ECU 50 turns off the motor 10, and turns off the SBW-ECU 50, after processing the shutdown.

Figure 6:
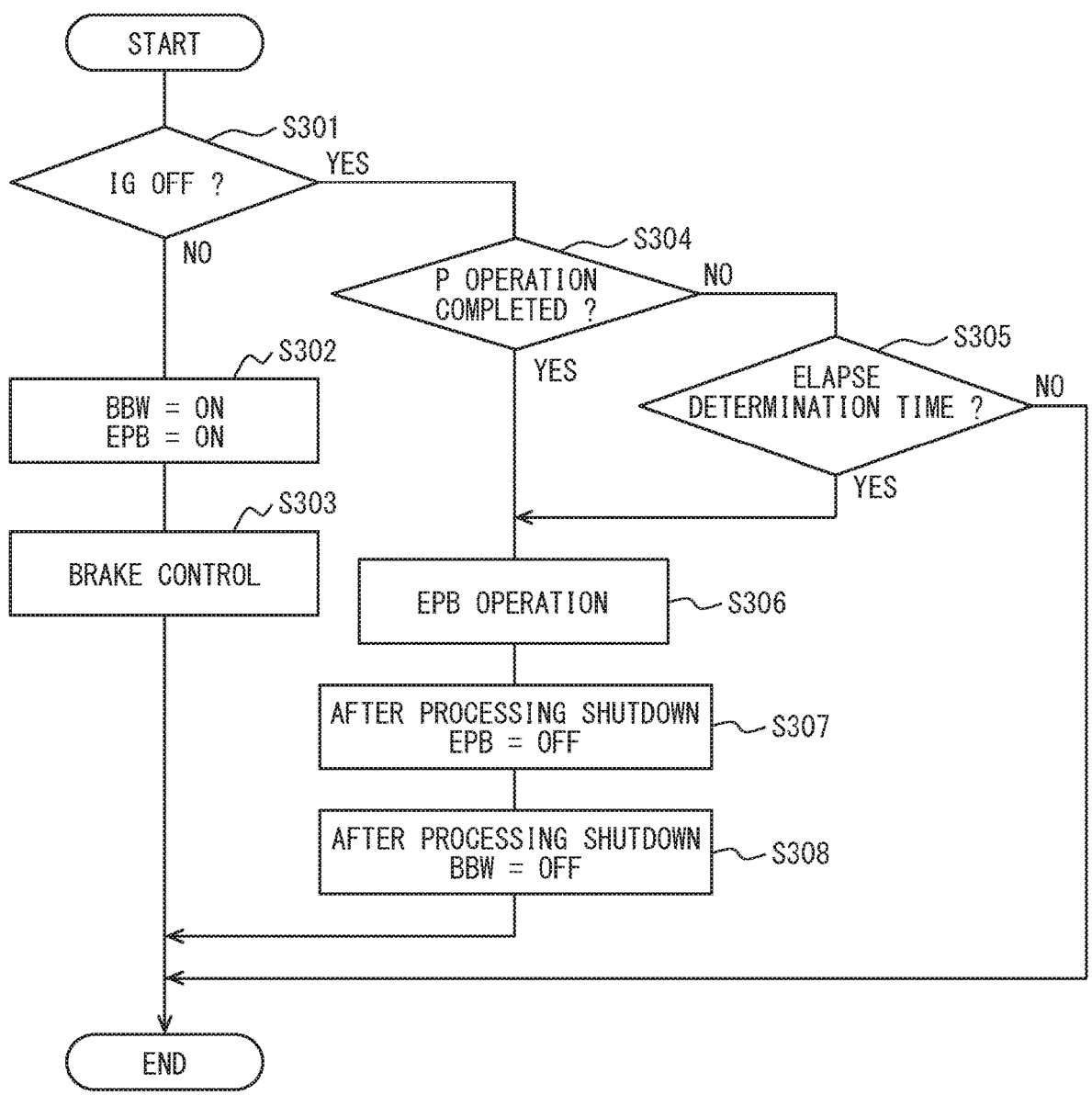
FIG. 6 is a flowchart illustrating a process for a power supply control in a brake control unit according to one embodiment.

The power supply control process in the brake control device 70 will be described based on the flowchart of FIG. 6. The brake control device 70 executes this process at a predetermined cycle. The process in which the operation subject is described as the brake control device 70 is assumed to be executed by at least one of the BBW-ECU 71 and the EPB-ECU 72.

In S301, the brake control device 70 determines whether the IG is turned off. When it is determined that the IG is not turned off (S301: NO), the process proceeds to S302, and the ON state of the brake-by-wire system and the electric parking brake system are continued. In S303, the brake control device 70 performs the brake control in response to an depression amount of the brake pedal, a command from the automatic parking ECU 75, and the like.

In S304, the brake control device 70 determines whether the P operation is completed in the shift-by-wire system 2. Completion of the P operation is determined based on a P operation completion notification transmitted from SBW-ECU 50. When it is determined that the P operation is completed (S304: YES), the process proceeds to S306. When it is determined that the P operation is not completed (S304: NO), the process proceeds to S305.

In S305, the brake control device 70 determines whether the determination time Xth is elapsed after the P operation command. Here, the brake control device 70 itself may measure the determination time and make the determination. Alternatively, when the information indicating that the P abnormality has occurred is received from the SBW-ECU 50, the brake control device 70 may determine that the determination time Xth is elapsed. When it is determined that the determination time Xth is not elapsed (S305: NO), the processes of S306 to S308 are not performed, and the ON state of the electric brake system 3 is continued. When it is determined that the determination time Xth is elapsed (S305: YES), the process proceeds to S306.

In S306, the EPB-ECU 72 drives the EPB actuator 66 to operate the EPB device 62. After the operation of the EPB device 62 is completed, the EPB actuator 66 is turned off.

In S307, the EPB-ECU 72 turns off the EPB-ECU 72 after processing the shutdown. As described above, when the EPB device 62 is operated, the braking state after turning off is continued until the brake release process is performed.

In S308, the BBW-ECU 71 turns off the BBW actuator 65, and after processing the shutdown, turns off the BBW-ECU 71.

Figure 7:
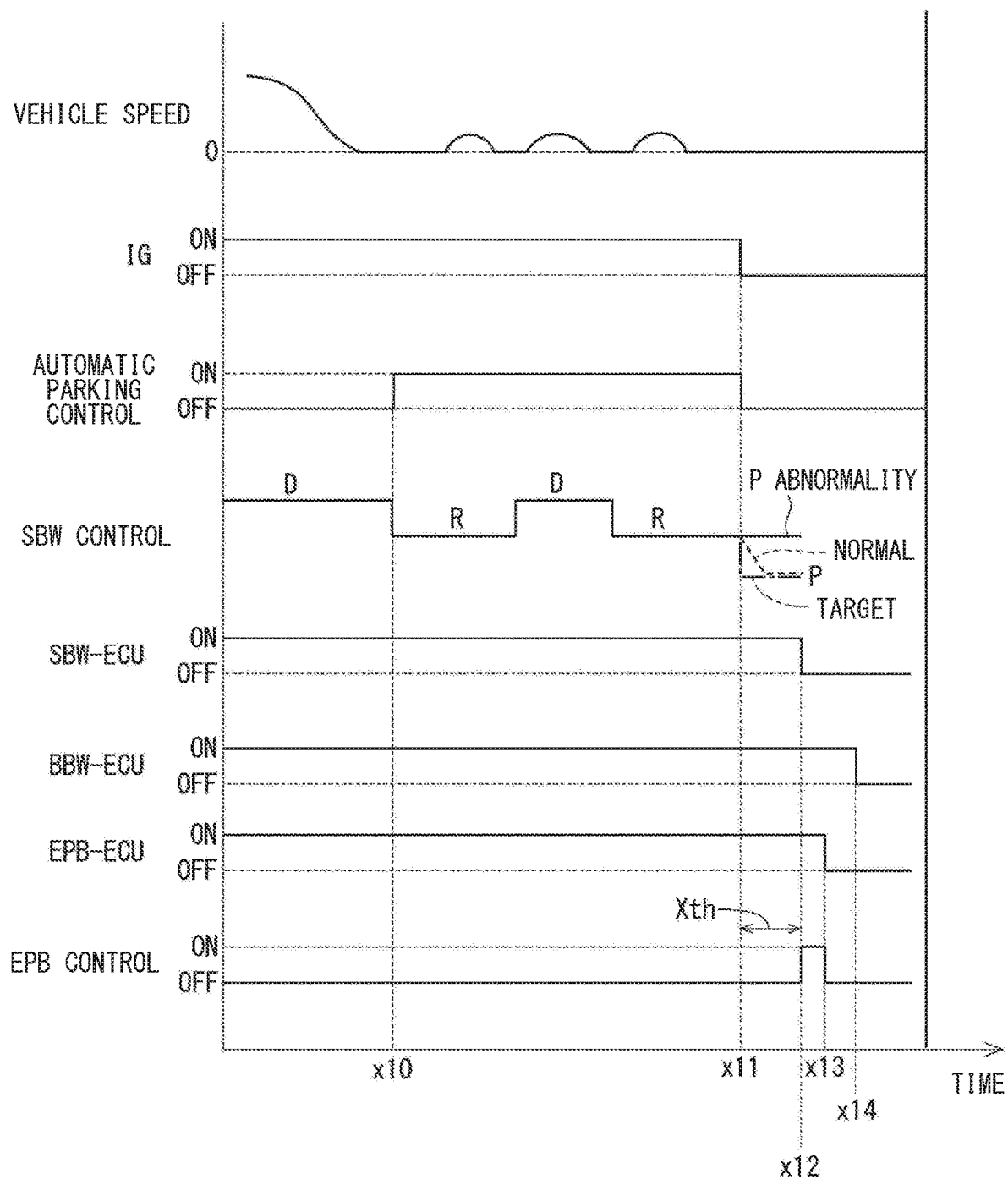
FIG. 7 is a time chart illustrating a process for a power supply control according to one embodiment.

The power supply control process according to the present embodiment will be described with reference to the time chart of FIG. 7. FIG. 7 shows the common time axis as a horizontal axis, and shows a vehicle speed, ON/OFF state of the IG, ON/OFF state of the automatic parking control, the SBW control, ON/OFF state of the SBW-ECU 50, ON/OFF state of the BBW-ECU 71, ON/OFF state of the EPB-ECU 72, and EPB control from a top of a vertical axis. In FIG. 7, it is assumed that the shift-by-wire system 2 is operating normally up to time x11, and that the P abnormality is detected when the shift range is shifted to the P range at time x11. For the sake of explanation, the time scale is appropriately changed and does not always match the actual time scale. Also, regarding the timing of turning off the ECUs 50, 71, 72, the time required for processing the shutdown is omitted.

At time x10, automatic parking control is performed in response to a command from the driver. During automatic parking control, switching of the shift range is repeated to park the vehicle at a desired location. In FIG. 7, the range is shifted from R to D, and from D to R, but the number of times of switching and the duration of each range are not limited.

At time x11, when the automatic parking control is completed and the IG is turned off, the target shift range is shifted to the P range as shown by the dashed line. When the shift-by-wire system 2 is normal, as shown by a broken line, the shift to the P range is performed at a timing before the determination time Xth elapses. In FIG. 7, it is described that OFF of the IG, OFF of the automatic parking control, and the switching command to the P range are performed simultaneously. However, for example, the switching to the P range may be commanded from the automatic parking ECU 75 and then the IG may be turned off, or the switching to the P range may be commanded with OFF of the IG as a trigger. The control order does not matter.

If the P abnormality in which the shift range is not shifted to the P range occurs even though the shift to the P range is instructed at the time x11, the EPB device is operated at the time x12 after the lapse of the determination time Xth from the time x11. At a time x13 after the operation of the EPB device 62 is completed, the EPB control is terminated, and after processing the shutdown, the EPB-ECU 72 is turned off. At time x14 after the EPB-ECU 72 is turned off, the BBW-ECU 71 is turned off. Although FIG. 7 illustrates the case of the P abnormality, in the present embodiment, the power is turned off in the order of the SBW-ECU 50, the EPB-ECU 72, and the BBW-ECU 71 regardless of presence or absence of the range mismatch abnormality.

Although BBW control is not shown in FIG. 7, the BBW control is performed in response to a command from the automatic parking ECU 75 or the like. An end timing of the BBW control may be the same as the EPB control end time x13, or may be any timing after the time x13 and before the time x14 when the BBW-ECU 71 is turned off.

As described above, the vehicle control device 100 of the present embodiment controls the vehicle control system 1 including the shift-by-wire system 2 and the electric brake system 3. The shift-by-wire system 2 switches the shift range by controlling the drive of the motor 10. The electric brake system 3 controls the drive of the BBW actuator 65 and the EPB actuator 66 to brake the vehicle.

The vehicle control device 100 includes a shift control unit and a brake control unit. In the present embodiment, the SBW-ECU 50, which is a shift control unit, controls the drive of the motor 10. The BBW-ECU 71 serving as a brake control unit controls the drive of the BBW actuator 65 serving as a brake actuator. The EPB-ECU 72 serving as a brake control unit controls the drive of the EPB actuator 66 serving as a brake actuator. When the start switch of the vehicle is turned off, the power supply of the BBW-ECU 71 and the EPB-ECU 72 is turned off after the switching of the shift-by-wire system 2 to the P range is completed.

For example, if the P abnormality occurs after the automatic parking is completed, the vehicle cannot be stopped by the shift-by-wire system 2, and there is a possibility that the vehicle may slide down. Therefore, in the present embodiment, after the switching of the shift-by-wire system 2 to the P range, the power of the BBW-ECU 71 and the EPB-ECU 72 is turned off. In other words, the BBW-ECU 71 and the EPB-ECU 72 are not turned off until the switching of the shift-by-wire system 2 to the P range is fully completed. Thus, when the P abnormality occurs, it is possible that the electric brake system 3 stops the vehicle, so that the safety in the event that an abnormality occurs in the shift-by-wire system 2 can be improved.

After the power of the SBW-ECU 50 is turned off, the power of the BBW-ECU 71 and the EPB-ECU 72 is turned off. In the present embodiment, the power is turned off in the order of the SBW-ECU 50, the EPB-ECU 72, and the BBW-ECU 71. As a result, even when the P abnormality occurs, the vehicle can be securely stopped.

The electric brake system 3 includes the EPB device 62 that can maintain the braking state even after the power is turned off. When the P abnormality occurs in the shift-by-wire system 2 in which the shift to the P range cannot be performed, the power of the BBW-ECU 71 and the EPB-ECU 72 is turned off after the EPB device 62 is operated. As a result, even when the P abnormality occurs, the vehicle can be securely stopped.

Other Embodiments

In the above embodiment, when the abnormality due to the range mismatch occurs, the BBW device 61 is operated to stop the vehicle. In another embodiment, when the abnormality due to the range mismatch occurs, the EPB device 62 may be operated in addition to the operation of the BBW device 61. Further, the EPB device 62 may be operated instead of the BBW device 61. In the above embodiment, the electric brake system includes the BBW system and the EPB system, but either one may be a mechanical type. Further, the electric brake system is not limited to the configuration of the above-described embodiment, as long as the braking can be controlled by the brake control device.

In the above embodiment, if the shift switching system is normal when the IG is turned off, the power OFF of the SBW-ECU 50, the power OFF of the EPB-ECU 72, and the power OFF of the BBW-ECU 71 are performed in this order. Further, when the P abnormality occurs when the IG is turned off, the power OFF of the SBW-ECU 50, the activation of the EPB device, the power OFF of the EPB-ECU 72, and the power OFF of the BBW-ECU 71 are performed in this order. In another embodiment, the power supply of the brake control unit may be turned off after the switching to the P range in the shift-by-wire system is completed or the vehicle is stopped by the electric brake system, and the above mentioned control order may be different. When the electric brake system does not include the EPB device, the operation of the BBW device may be continued without turning off the power of the BBW-ECU.

In the above embodiment, the SBW-ECU, the BBW-ECU and the EPB-ECU are provided as separate ECUs. In another embodiment, at least some of them may be provided as one ECU. In this case, the transmission and reception of various information may be performed internally without passing through the vehicle communication network.

In the above embodiment, the motor rotation angle sensor is the encoder. In another embodiment, the motor rotation angle sensor is not limited to the encoder, but any other device such as a resolver may be used. In the present embodiment, the potentiometer was illustrated as an output shaft sensor. In other embodiments, the output shaft sensor may be anything. For example, the output shaft sensor may be a switch that is turned on in each range guarantee area, or a non-contact magnetic sensor. Further, the output shaft sensor may be omitted.

According to the embodiments described above, the four recesses are formed in the detent plate. As another embodiment, the number of the recesses is not limited to four but may be any number. For example, two recesses corresponding to the P range and the notP range other than the P range may be provided. The shift range switching mechanism and the parking lock mechanism or the like may be different from those in the embodiments described above.

In the above embodiments, the decelerator is placed between the motor shaft and the output shaft. Although the details of the decelerator are not described in the embodiments described above, it may be configured by using, for example, a cycloid gear, a planetary gear, a spur gear that transmits torque from a reduction mechanism substantially coaxial with the motor shaft to a drive shaft, or any combination of these gears. As another embodiment, the decelerator between the motor shaft and the output shaft may be omitted, or a mechanism other than the decelerator reducer may be provided. The present disclosure is not limited to the above embodiment, and various modifications may be implemented without departing from the spirit of the present disclosure.

The present disclosure has been described based on the embodiments. However, the present disclosure is not limited to the embodiments and the structures. The present disclosure includes various modifications and further includes modifications within the range of equivalency. Further, various combinations and forms, further, other combinations and forms including only one element or more, or less of them, are also included in the category and range of idea of the present disclosure.

There has hitherto known a shift range switching device that switches a shift range by controlling a motor in response to a shift range switching request from a driver. For example, in Patent Document 1 (JP 2005-185068 A), abnormality diagnosis performs to distinguish an encoder abnormality, an output shaft sensor abnormality, and other abnormalities.

In Patent Document 1, when an abnormality is detected in the shift range switching device, the driver is notified of the abnormality by lighting a warning lamp or displaying a warning on an instrument panel. However, there is no mention of how to control other systems when an abnormality occurs in the shift range switching device. An object of the present disclosure is to provide a vehicle control device that improves safety when an abnormality occurs in a shift range switching system.

The vehicle control device according to the present disclosure controls a vehicle control system including a shift range switching system and an electric brake system. The shift range switching system switches a shift range by controlling a drive of a shift actuator. The electric brake system brakes a vehicle by controlling a drive of a brake actuator.

The vehicle control device includes a shift control unit that controls a drive of the shift actuator, and a brake control unit that controls a drive of the brake actuator. When a start switch of the vehicle is turned off, the power of the brake control unit is turned off after the shift range switching system completes the switching to the P range.

In other words, the power of the brake control unit is turned on until the shift to the P range is completed by the shift range switching system. As a result, for example, in the case where a P abnormality that makes it impossible to shift to the P range in the shift range switching system occurs, the electric brake system can stop securely the vehicle. Therefore, it is possible to improve safety when the abnormality occurs in the shift range switching system.

The invention claimed is:

1. A vehicle control device that controls a vehicle control system which includes a shift range switching system configured to switch a shift range by controlling a drive of a shift actuator, and an electric brake system configured to brake a vehicle by controlling a drive of a brake actuator, comprising:
 a shift control unit configured to control a drive of the shift actuator; and
 a brake control unit configured to control a drive of the brake actuator, wherein
 the electric brake system includes an electric parking brake device that can maintain a braking state even after power is turned off, and
 when a start switch of the vehicle is turned off,
 when a switching to a P range is completed in the shift range switching system, or
 when a determination time is elapsed from a command of the P range operation,
 a power supply of the shift control unit is turned off, and
 when the brake control unit receives a notification of a completion of the P range operation or information indicating that a P abnormality has occurred, or
 when the determination time is elapsed from the command of the P range operation,
 the electric parking brake device is activated, and the power supply of the brake control unit is turned off after the operation of the electric parking brake device is completed.

2. The vehicle control device according to claim 1, wherein,
 the P abnormality is a case where the shift range switching system makes it impossible to switch to the P range.

* * * * *